United States Patent [19]

Führing et al.

[11] 3,955,946

[45] May 11, 1976

[54] ADSORPTION DEVICE

[75] Inventors: Heinrich Führing; Emil Christof, both of Augsburg, Germany

[73] Assignee: Bowe Bohler & Weber KG Maschinenfabrik, Augsburg, Germany

[22] Filed: Apr. 3, 1973

[21] Appl. No.: 347,457

[30] Foreign Application Priority Data

Apr. 7, 1972  Germany............................ 2216672

[52] U.S. Cl................................... 55/179; 55/387
[51] Int. Cl.².......................................... B01D 53/04
[58] Field of Search................................ 55/58–62, 55/74, 179, 387

[56] References Cited
UNITED STATES PATENTS 2,114,810   4/1938   Ray.................................... 55/62 X

*Primary Examiner*—Charles N. Hart
*Assistant Examiner*—Richard Burks
*Attorney, Agent, or Firm*—Karl F. Ross; Herbert Dubno

[57] ABSTRACT

An adsorption device for the treatment of gases with a solid adsorbent comprises a disk-shaped cylindrical vessel having a horizontal axis and planar parallel vertical end walls, the conduits being connected to the vessel wall, preferably at diametrically opposite locations so that a number of such vessels may be horizontally stacked with or without removal of intervening end walls, thereby increasing the adsorption capacity of the installation or making it possible to operate two adsorption cells in functionally interchanging relationship such that one may be regenerated while the other serves to adsorb a component from a gas stream.

5 Claims, 9 Drawing Figures

Fig.1

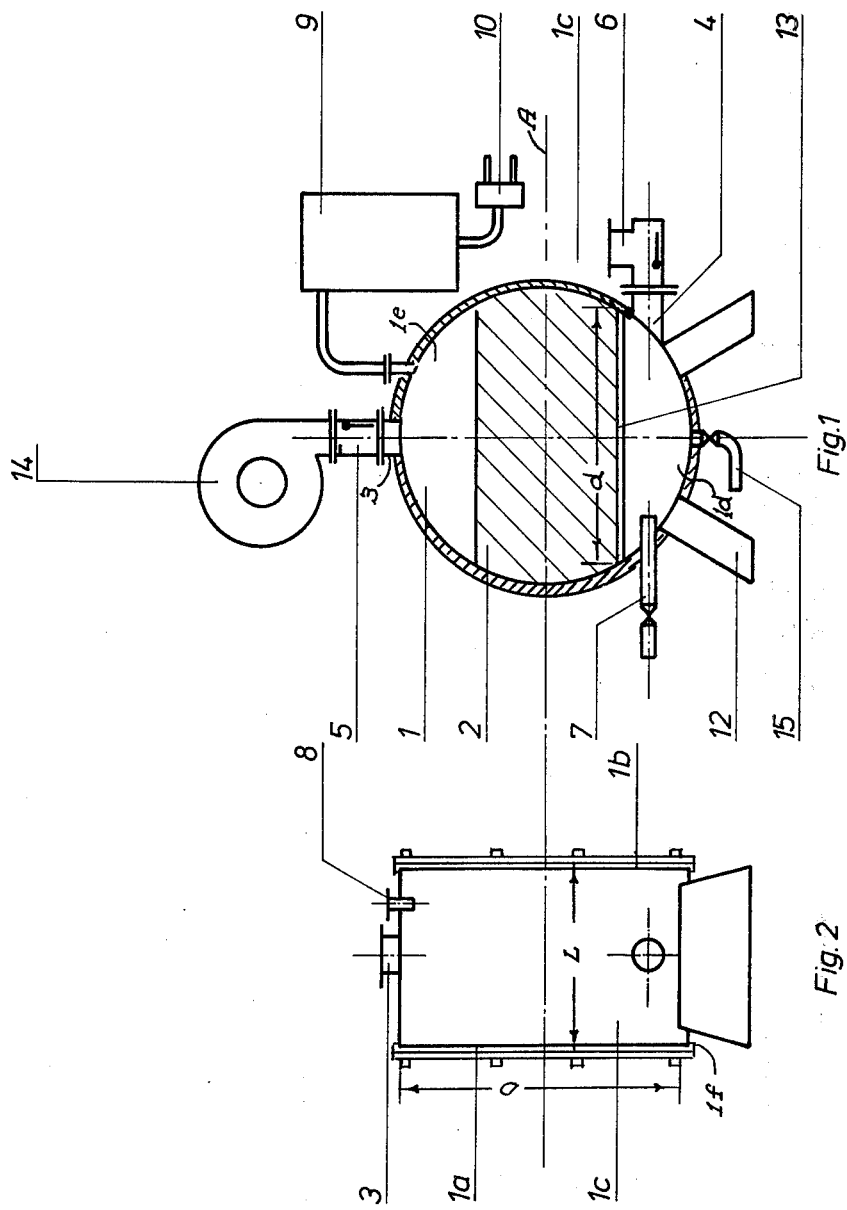

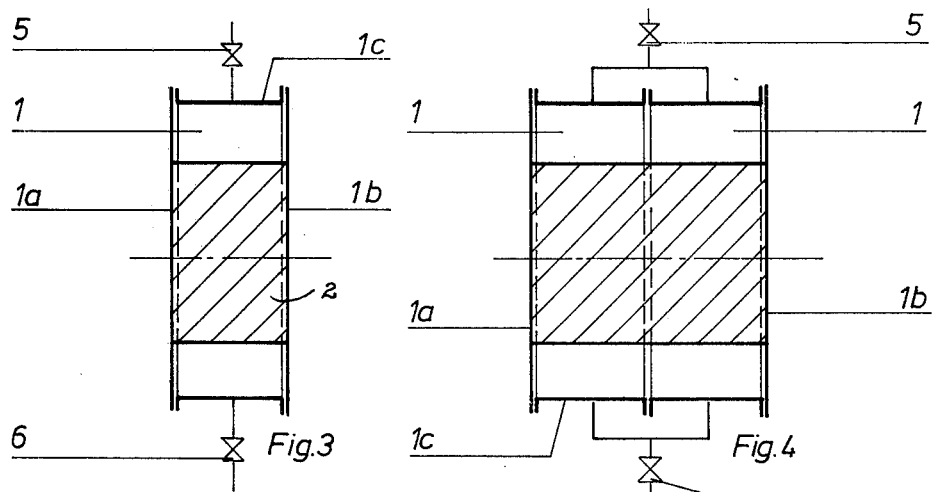
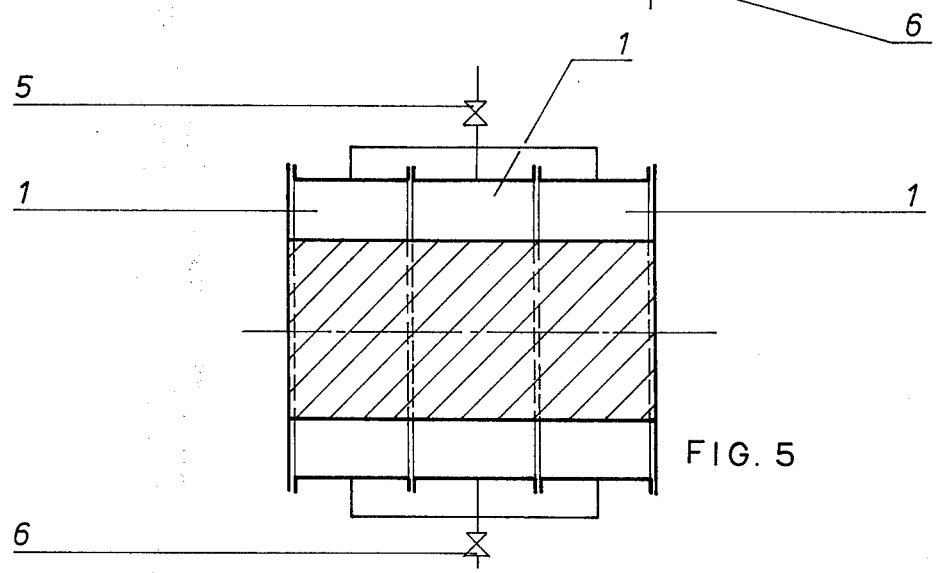
FIG. 5
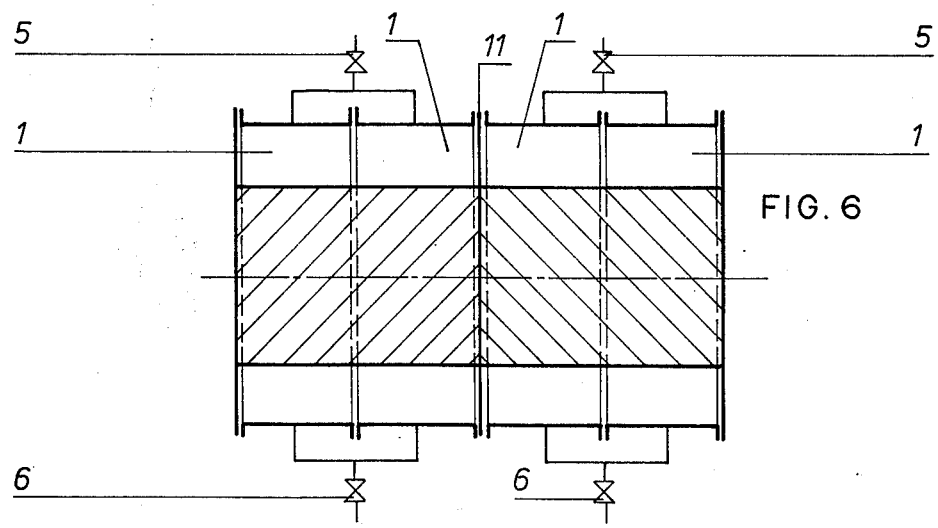
FIG. 6

ADSORPTION DEVICE

FIELD OF THE INVENTION

Our present invention relates to adsorption installations and, more particularly, to an adsorption system adapted to be expanded with ease.

BACKGROUND OF THE INVENTION

Adsorption installations are provided for many purposes and generally comprise an upright cylindrical vessel or housing receiving a columnar body of an adsorbent such as a molecular sieve or activated carbon, in one or more layers, the adsorption device may be used for the filtering of air, e.g. to recover solvent from a chamber in which lacquer is applied, in the treatment of gases of a metal degreasing installation, and for recovering dry-cleaning or textile-treating solvents from the air emerging from a treatment (dry-cleaning) vessel or a drying installation. In the latter case, the solvent is usually a chlorinated and/or fluorinated hydrocarbon and the adsorption device or adsorber contains a cartridge-like charge of the adsorbent material which may be regenerated by treatment with steam or other gas at an elevated temperature.

The housing generally has domed ends and is provided at its end walls with fittings for admitting the gas to be treated, the regenerating medium, etc., so that the assembly occupies considerable space and is not capable of expansion to accommodate increases in the quantity of gas to be treated. In such systems, therefore, it is usually required to provide an entirely new adsorber assembly with all of the aforementioned fittings and to connect it by complex piping arrangements, in parallel, with the original adsorber. Most frequently, however, it is not even possibble to include an additional adsorber unit in existing installations because of the spacial requirements of the original unit.

OBJECTS OF THE INVENTION

It is the principal object of the present invention to provide an improved adsorption installation whereby the aforementioned disadvantages can be avoided.

Still another object of the invention is to provide an adsorption system for the purposes described in which the adsorption capacity can be increased substantially without limit at relatively low cost and with a minimum of effort.

Yet another object of the invention is to provide an adsorption system for the purposes described which occupies a minimum of space and is capable of capcity increase or decrease at will.

SUMMARY OF THE INVENTION

These objects and others which will become apparent hereinafter are attained, in accordance with the present invention, in an adsorption installation which comprises at least one disk-shaped adsorption cell, preferably having a generally cylindrical housing with a horizontal axis and a pair of planar end walls lying in vertical planes parallel to one another and perpendicular to the axis, the body of adsorption material being received within this vessel and extending to the inner faces of the end walls and hence to the vertical planes defining the ends of the housing. The fittings for leading fluids to and removing them from each cell are provided preferably at diametrically opposite locations, i.e. above and below, with respect to the body of adsorption material in the cylindrical wall of the vessel while the body of adsorbent is defined between two horizontal planes intersecting the cylindrical vessel along chords thereof. Above and below the adsorbent, therefore, there are provided chambers of cylindrical-segmental configuration.

When the term "disk-shape" is used herein to describe the configuration of each adsorption cell, it is intended to thus define a cylindrical structure whose axial thickness is equal at most to the diameter thereof.

According to the present invention, the installation can be expanded simply by adding additional cells in axial (horizontal) alignment and in end-to-end relationship so that the intervening vertical planar end walls can be retained or removed whereby the cells can be operated individually or jointly.

According to an important feature of the invention, therefore, the installation comprises two substantially identical cells of the character described, attached in end-to-end relationship with a flange connection, the vertical planar end walls between the two cells being removed so that the cross sections of the two vessels are flush with one another and the adsorbent bodies in both are substantially adjacent one another. Once the two cells are rigidly joined together, they form a single adsorber unit since the gas distribution chamber on one side of the two bodies and the gas collection chamber on the other side of the two bodies are common to the two cells and the two bodies of adsorbent material constitute a single adsorption layer. It is thus possible in a simple and convenient manner to double the capacity of the adsorption device, the spacial requirements of the installation being increased by a doubling of the horizontal plan thereof. Since the disk-shaped cells have rectangular plans when oriented as described, the increased space required by the addition of the second cell is simply represented by a double of the area of the horizontal plan.

When the end wall between the two cells is retained as a partition, of course, the two cells can be operated independently or alternatively for adsorption and for desorption or regeneration.

As previously suggested, it is preferred that each cell have a circular cross-section in the plane perpendicular to the axis. It has been found to be advantageous to provide along a horizontal chord of the cell, therefore, a rectangular sieve whose edge dimension is less than the diameter and which supports the body of adsorbent material within the vessel. A sieve of this type is held in place securely by its own weight and the weight of the adsorption material thereabove.

DESCRIPTION OF THE DRAWING

The above and other objects, features and advantages of the present invention will become more readily apparent from the following description, reference being made to the accompanying drawing in which:

FIG. 1 is a diagrammatic vertical section through an apparatus for the adsorption of a component from a gas stream using an improved adsorption cell;

FIG. 2 is a side-elevational view thereof;

FIG. 3 is a diagrammatic axial section through a single cell of an adsorption unit according the the present invention;

FIG. 4 is a view similar to FIG. 3 in which two cells have been joined together and operate in common;

FIG. 5 is a vertical cross-sectional view through a unit in which three cells have been connected in parallel according to the present invention;

FIG. 6 is a view similar to FIG. 5 but illustrating an embodiment in which four cells are stacked but are partitioned into two-cell units adapted to operate alternately for adsorption and desorption;

SPECIFIC DESCRIPTION

Figure 7:
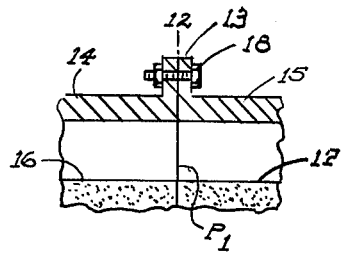
FIG. 7 is a detail view of a connection between two cells.

In the drawing, the adsorption cell 9 comprises a generally cylindrical vessel 1 having parallel vertical walls 1a and 1b bridged by a cylindrical wall 1c of an axial length L less than the diameter D thereof. As illustrated, the end walls 1b and 1a are attached to the cylindrical portion 1c by bolts along flanges 1f.

Figure 9:
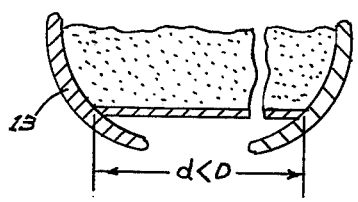
FIG. 9 is still another detail view illustrating the invention.

Within the vessel 1 (see FIG. 9) there is provided a sieve 13 of rectangular configuration with a length d less than the diameter D so that this sieve lies along a horizontal plane below the horizontal axis A in the device and thus extends along a chord of the lower part of the vessel 1.

A body 2 of an adsorbent, e.g. activated charcoal or carbon, rests upon the perforated plate 13 whose edge length in the direction parallel to the plane of the drawing is smaller than the diameter of the vessel as noted so that it rests firmly against the inner cylindrical wall of this vessel.

In the embodiment illustrated in FIG. 1, spaces 1e and 1d of cylindrical segmental configuration are provided above and below the body 2 of adsorbent and the various fittings open into these spaces or chambers.

The inlet fitting 3, for example, is connected by a valve 5 to the discharge side of a blower 14 which draws the gas to be treated from the installation or vessel in which it is produced and forces it downwardly through the chamber 1e and the adsorption body 2 therein. Upon emergence into the space 1d, the air, freed from the adsorbable compound (e.g. a chlorinated and/or fluorinated hydrocarbon) is discharged via outlet fitting 4 and valve 6, preferably again into the vessel from which the gas to be treated was drawn.

At the bottom of the cell 1, there is provided a steam inlet fitting 7, preferably with a cutoff valve, so that the adsorption body 2 can be regenerated with steam in the conventional manner. Above the body 2, the vessel 1 is connected via a fitting 8 with a condenser 9 and a water sprayer 10. Thus when valves 5 and 6 are closed, steam can be admitted from fitting 7 and passes through the adsorption body 2 and fitting 8 into the condenser 9. The solvent is here condensed and any water from the steam is separated at 10.

At the bottom of the cell 1 there is provided a separate condensate outlet fitting 15, likewise formed with a cutoff valve. The cell 1 is mounted on feet 12.

As can be seen from FIG. 3, the basic structure comprises a cell with a cylindrical housing and a pair of end walls 1a and 1b, the body 2 of adsorbent reaching to the inner faces of these end walls and the fittings 5 and 6, for passage of gas etc. through the adsorbent body are located above and below the latter.

By removing the right hand wall 1b, the cell 1 can be joined together with another similar cell whose wall 1a is removed, and shown in FIG. 4. The adsorption bodies 2 of the cell thus merge and form a single adsorption layer. The fitting at opposite sides of each cell may also be connected in parallel and provided with common valves 5 and 6 as illustrated in this Figure.

In FIG. 5, the system is shown to be expanded still further to accommodate three cells, the central cell having no end walls and each outer cell having only one end wall. In FIG. 6, a four-cell system has been illustrated wherein, however, between each pair of cells a partition 11 is provided in the form of one of the end walls 1a, 1b so that each pair of cells operates independently of the other pair. The pairs of cells may be provided with a common duct work so that one of the pairs of cells can be operated in an adsorption mode while the other is operated in a desorption or regeneration mode. When the desorption is complete in the latter cells or desorption has reached the capacity of the former, the pairs of cells may be functionally interchanged.

Figure 8:
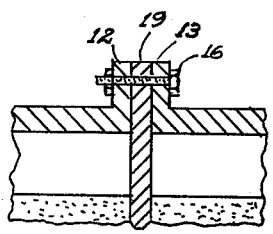
FIG. 8 is a view similar to FIG. 7 according to another embodiment of the invention.

In FIG. 7 we have shown a flange connection from which it will be apparent that each flange 12 or 13 of a pair of cells 14, 15 with adsorption body 16 and 17 can be brought into direct contact along a vertical plane $P_1$ and held thusly by bolts 18. When, however, a partition is desired, the bolts 18 may pass not only through the flanges 12, 13, but also through the planar wall 18 which is removed in FIG. 7. The partitioned arrangement has been illustrated in FIG. 8.

We claim:

1. An adsorption installation for the treatment of gases, comprising a plurality of cylindrical disk-shaped adsorption cells each having an axial length not exceeding its diameter and including a vessel having a horizontal axis defined between a pair of vertical planes; means in each vessel for supporting a respective body of adsorbent therein extending between the respective vertical planes, said cells being disposed in horizontal alignment and in end to end relationship with the vertical planes of adjacent cells abutting each other; means for rigidly connecting adjacent vessels of said cells together; fittings formed on said vessels above and below said bodies of adsorbent for passing a gas through said bodies within said vessels; and a pair of vertical planar end walls terminating said installation, one such end wall being fixed to the vessel of each cell at a respective end of the installation.

2. The installation defined in claim 1 further comprising a partition between two such cells and separating them into independently functioning units.

3. The installation defined in claim 1 wherein all of said cells have parallel vertical cross-sections.

4. The installation defined in claim 3 wherein the means for supporting said body of adsorbent in each of said cells includes a perforated member of rectangular outline having a length less than the diameter of the interior of the respective vessel and seated against the inner wall thereof.

5. The installation defined in claim 4 wherein each body of absorbent has horizontal upper and lower surfaces defining in the respective vessels upper and lower chambers of cylindrical segmental configuration.

\* \* \* \* \*